UNITED STATES PATENT OFFICE.

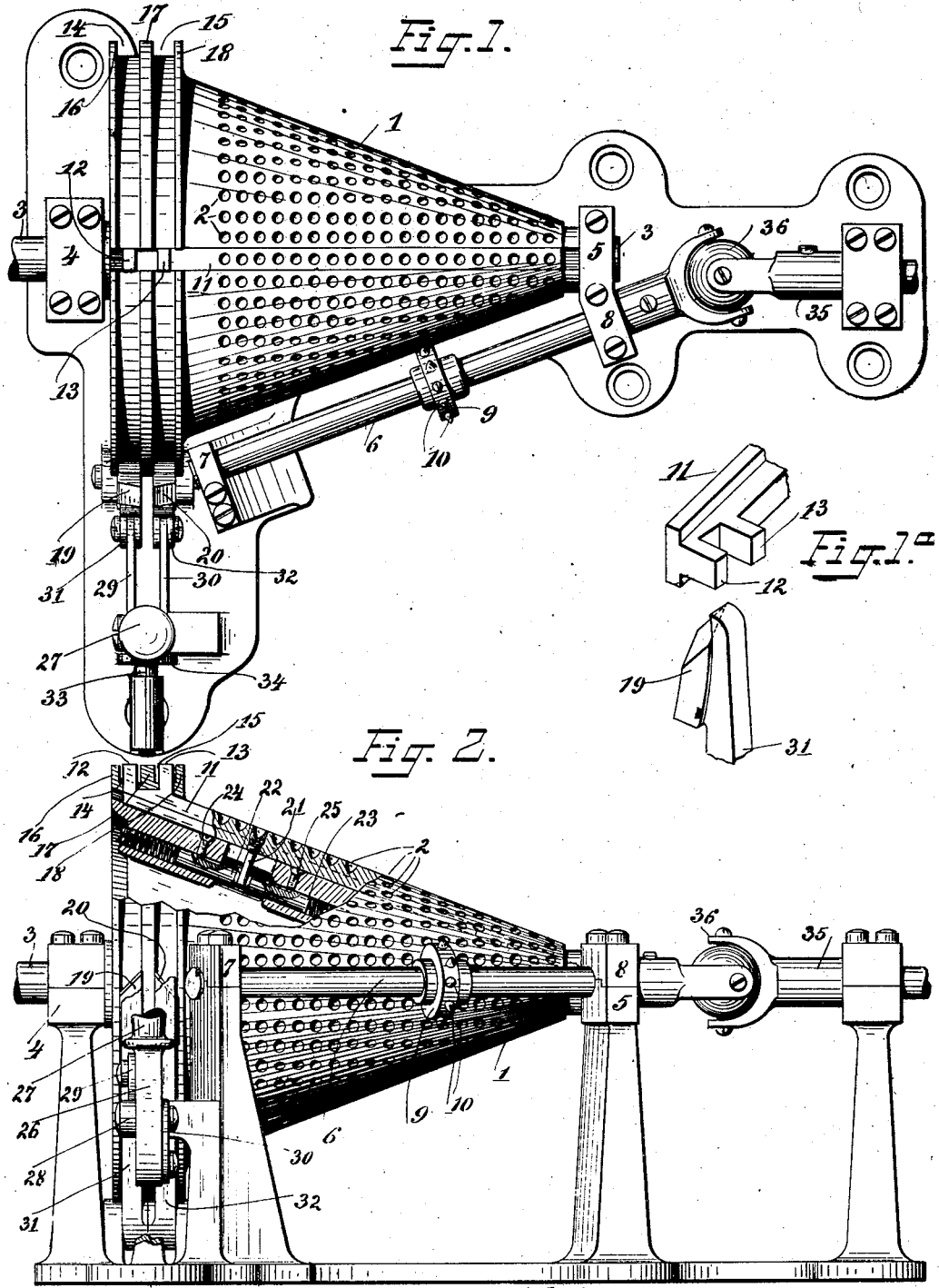

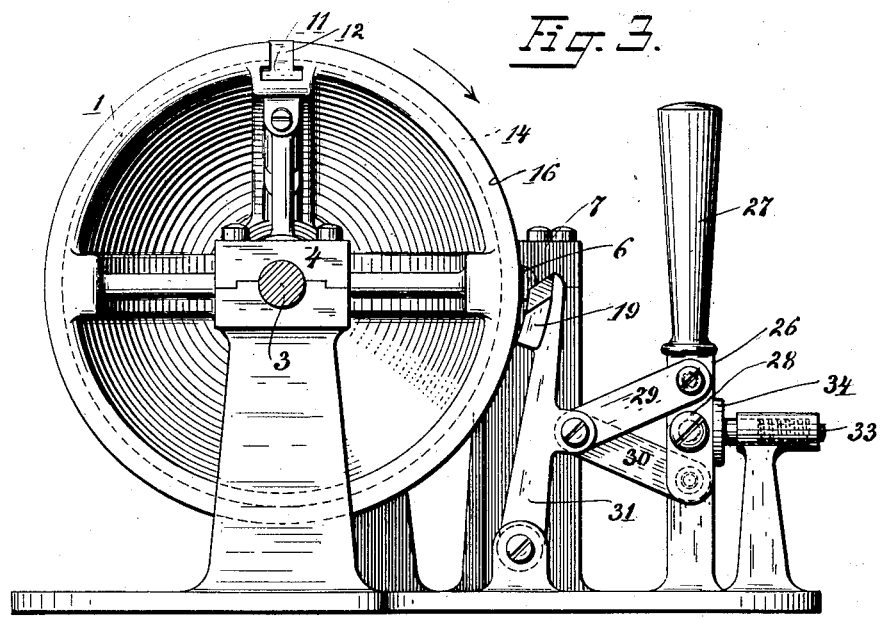
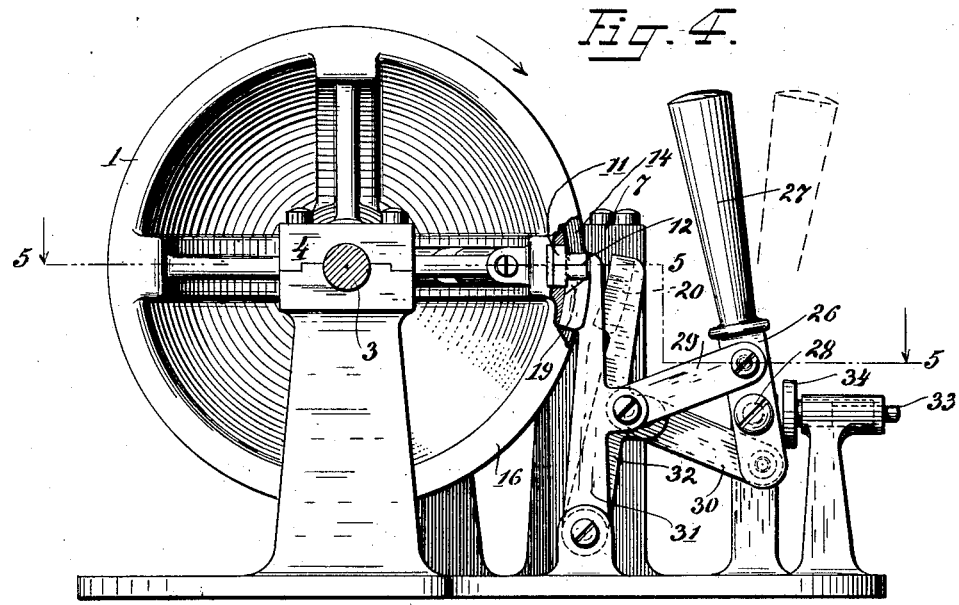

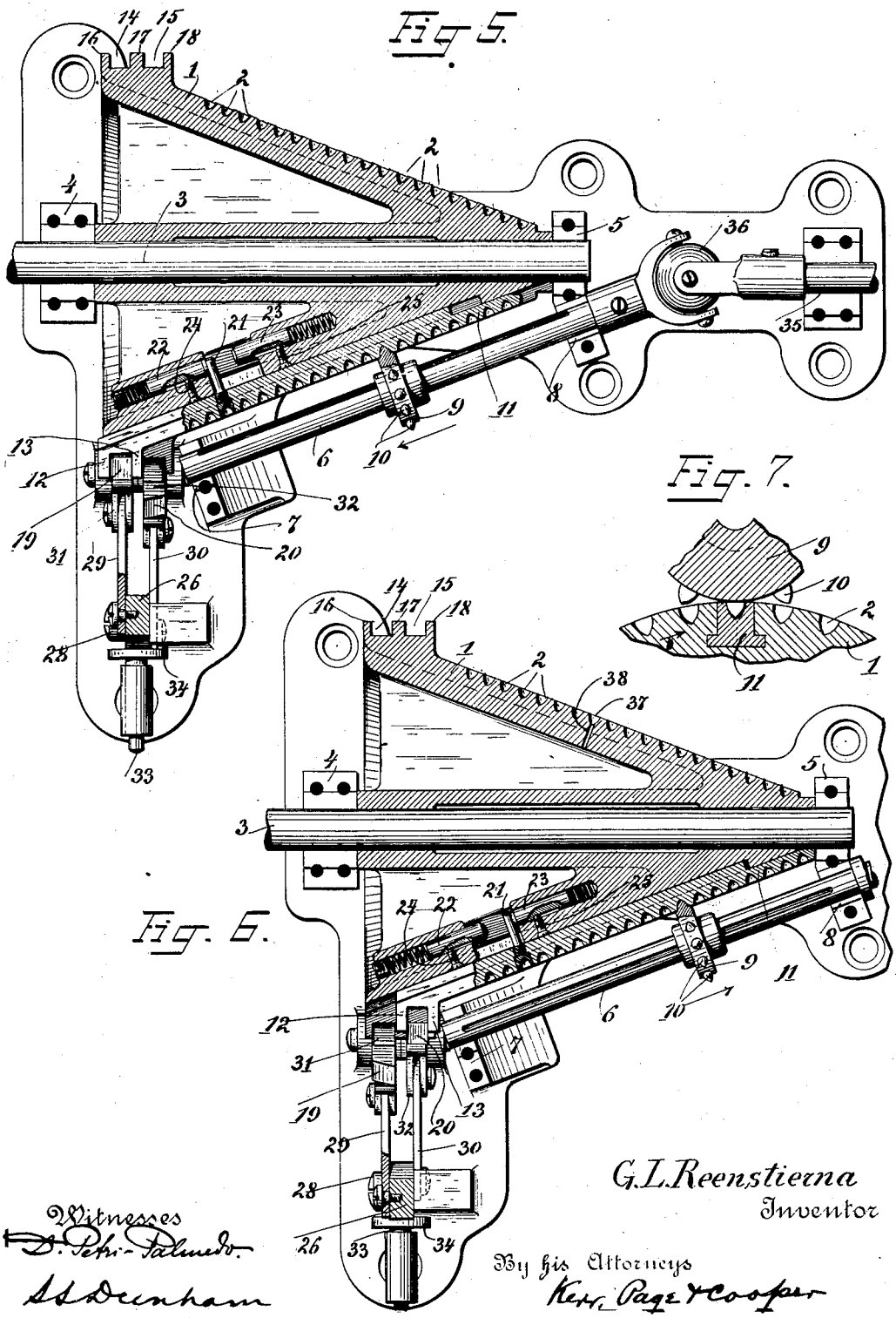

GUSTAF L. REENSTIERNA, OF EDGEWATER, NEW JERSEY, ASSIGNOR TO R-W SPEED VARIATOR CO., A CORPORATION OF NEW YORK.

VARIABLE-SPEED POWER-TRANSMISSION MECHANISM.

No. 889,333.   Specification of Letters Patent.   Patented June 2, 1908.

Application filed May 14, 1907. Serial No. 373,582.

*To all whom it may concern:*

Be it known that I, GUSTAF L. REENSTIERNA, a citizen of the United States, and resident of Edgewater, in the county of Bergen and State of New Jersey, have invented certain new and useful Improvements in Variable-Speed Power-Transmission Mechanism, of which the following is a specification.

My invention relates to mechanism for transmitting power from a rotary driving element to another rotary element whereby the latter may, within certain limits, be driven at any desired speed of rotation relative to the speed of the driving element.

The object of my invention is, briefly stated, to provide first, mechanism in which the engaging parts of the driving and driven elements shall not be subject to excessive shocks or strains as the speed of the latter element changes; second, a mechanism in which change of speed, having once been initiated, shall continue progressively and by regular increments until the limit of speed, either upper or lower, has been reached, or until the controlling means is positively put out of action; third, a mechanism in which the controlling means, upon being released by the hand of the operator, shall automatically and instantly assume an inoperative position, leaving the driven element rotating at the speed existing at the time the controlling means was released; fourth, a mechanism of the kind referred to, which shall be simple and durable in construction, which shall respond easily and quickly to the controlling means, and withal transmit power with a high degree of efficiency.

In carrying out my invention in its preferred form I provide a cone of suitable size and suitable pitch or slant, bearing on its curved surface a plurality of equidistant circular rows of equidistant pits, the cone being mounted to rotate on its axis. Parallel with the incline of the cone is a shaft carrying a pinion whose teeth are the same distance apart as the pits on the cone. The pinion is capable of movement on the shaft lengthwise thereof but is feathered to the shaft so that the two must rotate together. It is clear that, considering the cone to be the driving element and the pinion to be in mesh with any given row of pits on the cone, the pinion and its shaft will be driven at a corresponding speed, depending on the ratio of the number of teeth on the pinion to the number of pits in the engaged row; and that if the pinion be shifted on its shaft so as to engage another row of pits on the cone, the speed of the pinion and shaft will increase or decrease, according as the pinion is shifted toward the base or the apex of the cone. The means which I have devised for effecting this adjustment or shifting of the pinion embodies a principle which constitutes in some respects the most important feature of my invention and which I believe to be broadly new.

The means just referred to consists, briefly stated, in a longitudinally sliding bar mounted at the surface of the cone and having one pit of each circular row on the cone; together with mechanism, under the control of the operator and constituting the controlling means hereinbefore referred to, by which the said sliding bar may be shifted in either direction a distance equal to the space between two adjacent rows of pits. The teeth on the pinion being of such length and number that when any tooth thereof is completely engaged by a pit no other tooth, on either side, will be engaged by the cone, it is clear that, if at the instant one of the pits on the sliding bar is completely engaged, the bar be moved longitudinally a distance equal to the space between two rows of pits, the pinion will be shifted the same distance on its shaft, and that as the sliding bar is carried out of engagement with the pinion, by the continuing rotation of the cone, the teeth of the pinion will engage the next row of pits and its speed will be correspondingly changed according as the new row has a greater or a less number of pits. This operation takes place at each revolution of the cone, so long as the controlling means is kept in action, with the result that the speed of the pinion changes progressively,—and each time by the same increment or decrement since the rows of pits are equidistant and each must therefore differ from the next by the same number of pits.

It will be clear to those skilled in the art that the functions and operations thus briefly outlined may be performed by devices of various forms, and of these I have selected for illustration and description herein the apparatus which at the present time I consider the best form of the invention. This form is shown in the annexed drawings, in which Figure 1 is a plan view of the apparatus. Fig. 1ª is a detail perspective view. Fig. 2 is a side elevation, partly in section. Fig. 3 is an end view showing the normal or inactive position of the controller. Fig. 4 is an end view showing the controller in one of its active positions. Fig. 5 is a section on line 5—5 of Fig. 4, showing the controller in position for increase of speed. Fig. 6 is a similar section, but showing the controller in position for decrease of speed. Fig. 7 is a detail sectional view showing the gear in mesh with only the movable portion of the gear-cone.

Referring now to the drawings, 1 indicates the gear-cone, provided with a desired number of equidistant circular rows of equidistant gear-pits or apertures, as 2. The cone is rigidly secured on an axial shaft 3, mounted in suitable bearings 4, 5. Parallel to the slant of the cone is a shaft 6, in bearings 7, 8, and feathered on the shaft is a sliding gear wheel 9, having teeth 10, the same distance apart as the pits 2, so as to mesh therewith. It is of course obvious that with the gear in mesh with the row shown in Fig. 1 the speed of the gear (considering the cone to be the driving or power-driven element) will be greater than if it were in mesh with a row nearer the apex of the cone, and less than if it were in mesh with the row nearer the base. It is clear of course that either the cone or the gear and shaft may be the driving and the other the driven element, but for practical purposes I prefer to employ the cone as the driving element and hereinafter it is considered to be such element.

The method which I employ for shifting the gear longitudinally of its shaft constitutes, as before stated, the most important feature of the invention. The preferred mechanism for the purpose will now be described.

Mounted to slide longitudinally at the periphery of the cone is a bar or slide 11, in which one gear-pit of each row on the cone is formed, making a series in straight line sequence, as clearly shown in Figs. 1, 5, and 6. This slide or bar should be incapable of displacement radially of the cone, and such displacement may be prevented by making the bar and groove or guide-way in which it slides of suitable cross section, for example that shown in Fig. 3. The parts being so proportioned that when any tooth on the gear is completely in engagement with a pit, as in Fig. 7, the adjacent teeth on each side are entirely disengaged, and preferably separated some little distance from the surface of the driving element, as clearly shown in Fig. 7, it is evident that at the instant a tooth is completely engaged in a pit on the movable portion the latter may be shifted in either direction and will carry the gear with it. If the slide (the movable portion of the cone) be shifted exactly the distance between two rows of pits, and quickly enough relatively to the peripheral speed of the cone and gear, the next tooth on the latter will engage the approaching pit on the next higher or lower row, according to the direction in which the slide was moved, and the angular speed of the gear will be changed correspondingly.

Attention is called to the fact that the slide or bar 11 is narrow relatively to the circumference of the cone, so as to bear only one gear-pit from each circular row thereon, as clearly shown in Fig. 1. It can readily be seen that this makes the apparatus radically different from devices in which an entire half of a conical assemblage of gears is movable relatively to the other half. For example in my apparatus the axis of rotation of the transmission gear 9 can be parallel to the slant of the cone instead of to the axis of the cone, thus permitting the gear to be mounted directly on the driven shaft, 6, instead of necessitating the interposition of a second gear, between the transmission gear and the driven shaft. Again, the inertia of the entire half of the cone would be great, due to its weight, and the force necessary to start and stop such movable half to shift the gear would be correspondingly great, thus putting equivalent strain on the parts which effect the movement of the half-cone, in addition to the force required to effect change of speed, in other words to accelerate or retard the load. In my apparatus, however, the slide, being narrow, is of comparatively slight weight and hence has but small inertia, its inertia being in fact practically negligible. It will also be observed that the slide 11 is of the same width throughout its length, that is, its sides are parallel. This construction permits the slide to be shifted in either direction. It is clear that unless the slide be of this form, nothing less than a half of the cone can be used; since a tapered slide could be adjusted only in one direction.

It will be observed that the teeth on the gear are pointed. If they were not pointed, or at least tapered, it is clear that if the slide had not completed its movement by the time the extremity of the next tooth came flush with the surface of the cone the tooth, unless the pit were of considerably larger diameter, would not strike the approaching pit but would strike the surface of the cone instead. With pointed or at least tapering teeth, however, the extremity of the tooth can engage the approaching pit, even though the slide has not completed its movement, and work into the same as the slide comes to rest. The teeth may of course be conical or frusto-conical and the pits cylindrical or conforming to the shape of the teeth, but the form of both the teeth and the pits is preferably based on the involute of a circle, in accordance with the well understood principles of toothed gearing.

For the purpose of shifting the slide it is provided, at the end adjacent to the base of the cone, with two outwardly or radially extending lugs 12, 13, projecting into two circumferential grooves 14, 15, at the base of the cone, formed by ribs 16, 17, 18. In the plane of the shafts 3 and 6, and adjacent to the aforesaid grooves, are two cams or cam-like members 19, 20, having their upper surfaces inclined as shown and each adapted to be thrown into its appropriate groove independently of the other. The lugs on the slide 11 are so arranged and spaced that they lie normally as shown in Figs. 1 and 2, with a slight space between each lug and the central rib 17. Assuming now that one of the cams, for example 19, is thrown into its groove, as in Fig. 4, it is evident that as the cone brings the slide opposite the shaft 6 and gear 9 the point of the cam will enter the space between the lug 12 and center rib 17, and will, as the cone continues its rotation, cause the slide to move toward the base of the cone, as in Fig. 5, carrying with it the gear 9 in the direction of the arrow. Of course the space between the lugs must be at least wide enough to permit the two lugs to pass on either side of the cam after the movement of the slide is completed, while the cam itself, the width of the groove, and the space between the lugs, must be so proportioned, as can be done by a skilled mechanic, that the movement of the slide will be sufficient in extent to bring the gear opposite the next row of gear-pits.

If with the parts in the normal position, shown in Figs. 1 and 2, cam 20 be thrown into its groove, it will engage lug 13 and cause the slide to move toward the apex of the cone, as in Fig. 6, as will readily be understood. It is evident that, in both cases, the slide must be in its normal or initial position when the cam is thrown into the groove or no further shifting of the gear can be effected. In other words, the slide having once been shifted cannot be shifted again, in either direction, unless first returned to its initial position. Any convenient and suitable means may be provided for returning the slide, for example the devices illustrated in Figs. 3, 5, and 6, and now to be described.

Extending inwardly from the slide, through a longitudinal slot in the cone, is a pin 21, against which bear two oppositely acting spring-pressed plungers 22, 23, whose movements are limited by stop screws 24, 25, working in grooves in the plungers, as clearly shown in Fig. 2. As the slide is actuated, pin 21 presses one or the other plunger back, against the tension of its spring; but when the rotation of the cone carries the slide out of engagement with the gear the tension of the compressed spring instantly throws the plunger and the slide back to their initial position, that is, until the plunger is arrested by its stop-screw. If now the same cam, for example cam 19, is in its operative or actuating position when the slide again comes around to the plane of the gear, it is clear that the slide and the gear will again be shifted in the same direction as before, after which the slide will be again returned to its initial position; and inasmuch as the operation described takes place at each revolution of the cone, as long, of course, as the cam is kept in its groove, the gear will move steadily down the cone (or up, as the case may be) until finally the gear is in mesh with the last row of pits and bears against the adjacent bearing of the shaft 6. Another movement of the slide would then be impossible; but nevertheless the cam would engage the lug, and since the latter cannot move it would be broken off or the cone and gear would be brought to rest. Provision is therefore made for throwing the cam out of the groove when the lug strikes it and again after the gear has been carried to the last row of pits. I utilize the cams themselves to effect this result, and do so by making their cam surfaces inclined not only to the base of the cone, but also to the axial plane perpendicular to the base, as shown in Fig. 1ª. The result is that not only does each cam tend to shift the slide, but also each lug tends to throw its cam radially outward; so that to cause the slide to move, the cam must be held positively in the groove with sufficient force to overcome the plunger-spring tending to hold the slide in its initial position. This, however, requires no great effort on the part of the operator, but when the last row of pits is reached by the gear and the slide is therefore held against further movement, the power driving cone is exerted radially outward against the cam and urges the latter outward with sufficient force to overcome any effort of the operator to hold it in place. It will therefore be seen that when either the upper or the lower limit of speed is reached the cam is automatically thrown out of action.

Any suitable mechanism or devices may be employed for the manual actuation of the cams, but I prefer means which will permit only one cam at a time to be thrown into operation and which will automatically assume a position holding the cams out of the grooves as soon as released by the operator. Mechanism having such capabilities is illustrated in the drawings, more clearly in Figs. 3 and 4. Referring now to these figures, 26 represents a lever which may be actuated by the operator in any convenient manner, as by means of a handle 27. The lever is fulcrumed at 28, between the vertical planes in which the cams move, and on opposite sides of its fulcrum is connected by links 29, 30, with the pivoted arms 31, 32 which carry at their tops the cams 19 and 20, respectively. It will now be seen that if the handle 27 be swung toward the cone the arm 31 will be thrown toward the cone and the cam 19 carried into its groove, and the arm 32 and cam 20 thrown away from the cone, as clearly shown in Fig. 4; while if the handle be swung in the opposite direction the arm 30 and cam 19 will be withdrawn from the cone and arm 32 and cam 20 thrown into action. It is therefore impossible to put both cams into the grooves at the same time.

Directly back of the lever 26, as viewed in Figs. 3 and 4, is a plunger 33, spring-pressed toward the lever and having a flat face 34 bearing against the latter. This plunger is in line with the fulcrum or pivot of the lever, and hence oscillation of the lever in either direction will push the plunger backward against its spring. The result is that whenever the operator ceases to exert force on the lever the plunger will at once advance under the influence of its spring and bring the lever to the inoperative position, shown in Fig. 3, in which position both cams are out of action. Of course if it is desired that the power be transmitted to an element rotatable on an axis in line with or parallel to the axis of the cone, as for example the shaft 35, Fig. 1, the shaft 6 may be connected thereto in any convenient and suitable manner, as by means of a universal joint 36.

It will now be seen that the apparatus herein described possesses all the advantages mentioned as being among the objects of my invention. The gear is never, at any time, out of mesh with some portion or another of the driving element and the parts therefore cannot be subject to the severe shocks and strains so frequently produced in apparatus in which the driving and the driven elements are entirely disengaged and then reëngaged at higher or lower gear ratio. The gear moves by equal steps up or down the cone, and as the steps are short the consequent decrease or increase of speed is correspondingly small, thus still further reducing the strains on the intermeshing parts, as will be readily understood. At the same time, since the increment or decrement of speed is small, the force required to move the gear on its shaft is also small and puts only slight strain on the slide-lugs and the cams; and since the increment or decrement of speed is constant the force required to shift the gear is never greater at one part of the cone than at another but is always the same. Hence the controlling devices may be thrown in operation at any time, the parts being no more liable to injury when the gear is at one part of the cone than when it is at another, so far as strains incident to mere change of speed are concerned.

If desired, apertures may be provided extending from the bottoms of the gear-pits to the interior of the cone, as indicated at 38, Fig. 6, in connection with the gear pit designated by 37. Foreign matter, such as mud, grease, etc., accumulating in the pits may be pushed out through these apertures, thus making cleaning of the cone comparatively easy. In fact the teeth on the gear will crowd the foreign matter down to the bottom of the pits and into the apertures, thus keeping the pits substantially free from dirt at all times.

As previously stated, the apparatus herein specifically described is merely typical of the invention as the preferred form thereof and may be modified in various ways without departure from the proper scope of the invention, which is defined by the following claims:

What I claim is,

1. In a variable speed power transmission mechanism, in combination, a rotatable gear-cone having a narrow longitudinally movable slide of the same width throughout its length; a gear in mesh with the cone, and adjustable longitudinally on its axis; and means for shifting the said longitudinally movable slide of the cone when the gear is in engagement with such slide; as set forth.

2. In a variable speed power transmission mechanism, in combination, a rotatable gear-cone, a narrow slide of the same width throughout its length movable longitudinally in the cone and constituting a portion of the gear-surface thereof, a gear in mesh with the cone and movable axially in a direction parallel to the slant of the cone, and means for actuating the said slide when the gear is in engagement with the same, as set forth.

3. In a variable speed power transmission mechanism, in combination, a gear-cone rotatable on its axis, a narrow longitudinally movable slide of the same width throughout its length in the cone constituting a portion of the gear-surface thereof, a gear in mesh with the cone and axially adjustable in a direction parallel to the slant of the cone, and manually controlled means for actuating said slide, as set forth.

4. In a variable speed power transmission mechanism, in combination, a gear-cone rotatable on its axis a narrow longitudinally movable slide of the same width throughout its length in the cone constituting a portion of the gear-surface thereof, a gear in mesh with the cone and axially adjustable in a direction parallel to the slant of the cone, and a cam adapted to engage the said slide to shift the same, as set forth.

5. In a variable speed power transmission mechanism, in combination, a gear-cone rotatable on its axis, a narrow longitudinally movable slide of the same width throughout its length in the cone constituting a portion of the gear-surface thereof, an axially adjustable gear in mesh with the cone and having its axis parallel to the slant of the cone, a pair of cams adapted to engage the said slide to shift the same in opposite directions, and means for throwing either cam at will into engagement with the slide, as set forth.

6. In a variable speed power transmission mechanism, in combination, a gear-cone rotatable on its axis, a longitudinally movable slide in the cone constituting a portion of the gear surface thereof, an axially adjustable gear in mesh with the cone and having its axis parallel to the slant of the cone, a pair of cams movable toward and from the cone in a plane common to the axes of the cone and gear and adapted to engage said slide to shift the same in opposite directions, and means for throwing either cam at will into engagement with the slide, as set forth.

7. In a power transmission mechanism, in combination, a rotatable gear-element, a slide movable longitudinally in said element, constituting a portion of the gear-surface thereof and having a radially projecting lug, a gear in mesh with said element and axially adjustable longitudinally thereof, and a cam adjustable in a plane transverse to said element and adapted to engage the said lug on the slide to shift the latter, as set forth.

8. In a variable speed power transmission mechanism, in combination, a gear-cone rotatable on its axis, a narrow slide of the same width throughout its length extending lengthwise in the cone, constituting a portion of the gear-surface thereof and capable of limited longitudinal movement in either direction, means for normally maintaining the slide in a position central to the limits of its travel, a gear in mesh with the cone and axially adjustable longitudinally thereof, and means for shifting the slide in one direction or the other, as desired, at each revolution of the cone, as set forth.

9. In a variable speed power transmission mechanism, in combination, a gear-cone rotatable on its axis, a narrow slide of the same width throughout its length movable longitudinally in the cone, constituting a portion of the gear-surface thereof, a gear in mesh with the cone and axially adjustable longitudinally thereof, and a device adapted to engage and actuate the slide intermittently to shift the gear step-by-step in a given direction and adapted to be thrown out of operative position relative to said slide when the gear reaches the limit of its travel in the given direction, as set forth.

10. In a variable speed power transmission mechanism, in combination, a gear-cone rotatable on its axis, a slide movable longitudinally in the cone and constituting a portion of the gear-surface thereof, a gear in mesh with the cone and axially adjustable longitudinally thereof, a pair of cams movable toward and from the cone transversely thereto, adapted to engage the slide and shift the same in opposite directions, and manually actuated means for advancing either cam at will toward the cone and simultaneously retracting the other, as set forth.

11. In a variable speed power transmission mechanism, in combination, a gear-cone rotatable on its axis, a slide movable longitudinally in the cone and constituting a portion of the gear-surface thereof, a gear in mesh with the cone and adjustable longitudinally thereof, a pair of cams movable toward and from the cone transversely thereto, adapted to engage the slide and shift the same in opposite directions, a lever pivoted to swing in a plane transverse to the cone, and devices connecting the cams to respective points on opposite sides of the pivot of the lever, whereby when either cam is advanced toward the cone the other will be retracted, as set forth.

12. In a variable speed power transmission mechanism, in combination, a gear-cone rotatable on its axis, a narrow slide of the same width throughout its length movable longitudinally in the cone and constituting a portion of the gear surface thereof, a gear in mesh with the cone and axially adjustable longitudinally thereof, devices for shifting the slide, adapted to be thrown singly into operative position relative to the slide, and means for normally holding said devices in operative position, as set forth.

13. In a variable speed power transmission mechanism, in combination, a gear-cone rotatable on its axis, a slide movable longitudinally in the cone and constituting a portion of the gear-surface thereof, a gear in mesh with the cone and adjustable longitudinally thereof, a pair of cams movable toward and from the cone transversely thereto, adapted to engage the slide and shift the same in opposite directions, a lever pivoted to swing in a plane transverse to the cone, devices connecting the cams to respective points on opposite sides of the pivot of the lever, whereby the cams may be advanced singly toward the cone, and means for yieldingly holding the lever with both cams retracted, as set forth.

14. In a variable speed power transmission mechanism, in combination, a rotatable gear-cone having a plurality of circular rows of gear-pits, a gear in mesh with a row of pits, and means for shifting the gear from row to row without disengagement from the cone, said means comprising a narrow slide of the same width throughout its length movable longitudinally in the cone and bearing a single gear pit of each row of such pits on the cone, and devices for moving said slide, as set forth.

15. In a power transmission mechanism, in combination, a rotatable gear-element having equidistant circular rows of gear-pits, a gear in mesh with said element and axially adjustable longitudinally thereof, and means for shifting the gear from row to row of gear pits without disengagement from the element, said means comprising a narrow slide of the same width throughout its length movable longitudinally in the cone and bearing a single gear pit of each row of such pits on the cone, and devices for moving said slide, as set forth.

16. In a variable speed power transmission mechanism, in combination, a cone rotatable on its axis and having conical gear-pits arranged in equidistant circular rows, a gear having conical teeth, engaging said cone and axially adjustable longitudinally thereof, and means for shifting said gear from row to row of pits while the cone is rotating and without disengaging the gear and the cone, said means comprising a narrow slide of the same width throughout its length movable longitudinally in the cone and bearing a single gear pit of each row of such pits on the cone, and devices for moving said slide, as set forth.

17. In a power transmission mechanism, in combination, a rotatable gear-element having a narrow slide of the same width throughout its length movable longitudinally in a plane passing through the axis of said element, an axially adjustable gear in mesh with said element, and means for shifting the longitudinally movable slide in the said element while the gear is in mesh with the said movable slide, as set forth.

GUSTAF L. REENSTIERNA.

Witnesses:
FRANCIS X. CARMODY,
S. S. DUNHAM.